MAGNETIC TAPE WRITING SYSTEM

Filed Nov. 26, 1956 3 Sheets-Sheet 1

INVENTORS
JACOB GOLDBERG
BONNAR COX
BY Lyon & Lyon
ATTORNEYS

MAGNETIC TAPE WRITING SYSTEM

Filed Nov. 26, 1956 3 Sheets-Sheet 2

INVENTORS
JACOB GOLDBERG
BONNAR COX
BY Lyon & Lyon
ATTORNEYS

INVENTORS
JACOB GOLDBERG
BONNAR COX
BY Lyon & Lyon
ATTORNEYS

United States Patent Office 2,913,707

Patented Nov. 17, 1959

2,913,707

MAGNETIC TAPE WRITING SYSTEM

Jacob Goldberg and Bonnar Cox, Palo Alto, Calif., assignors, by mesne assignments, to General Electric Company, New York, N.Y., a corporation of New York Application November 26, 1956, Serial No. 624,308

9 Claims. (Cl. 340—174)

This invention relates to systems for writing data on magnetic tape and, more particularly, to improvements in the method and means for writing digital data on magnetic tape.

Magnetic tape is employed in present-day information-handling machines as a storage system for data. Since these information-handling machines are employed as inventory control machines or data-processing machines for business, usually large amounts of data are involved. In the process of transferring such data into tape, usually the source of the data is one that either runs faster or slower than the tape speed, or, because of other limitations, a direct transfer between the source of data and the magnetic tape cannot be made. For this reason, it is customary to enter the data from the source into a register. The register then has its contents emptied onto the tape. Thereafter, the register is again filled and its contents are written into the tape after the material previously written. In view of the large amount of data required to be transferred to the tape, it is desirable that each time the register contents are written into the tape, they be written as close to the material previously written on the tape as can possibly be achieved without destroying the information. This is known as packing. If the packing is not efficiently done, then large amounts of tape are wasted and also the time required to search the tapes for information at a subsequent date is increased, and the search operation itself is made more difficult.

It is an object of the present invention to provide a novel and improved method and apparatus for packing information on magnetic tape.

It is another object of the present invention to provide an efficient method and apparatus for writing data on magnetic tape.

After data is transferred to magnetic tape, it is a desirable practice to check whether or not the data on the tape was properly transferred from the register. Accordingly, it has been customary to read the data which has been written over again and then to make a check, either by comparison with the original data, or by validity and/or parity checks, whether or not the data now recorded on the tape is proper.

Another object of the present invention is the provision of a unique arrangement for checking whether or not the data written on the tape is correct.

Yet another object of the present invention is the provision of a system which more efficiently utilizes the time required for writing data on magnetic tape and checking the correctness thereof.

These and other objects of the present invention are achieved in an arrangement whereby a special marker track is provided adjacent the data tracks on the magnetic tape. The last data entry transferred from a register employed for writing information onto the tape has two pulses written into the special marker track at the beginning of this last data entry and two pulses written in the special marker track at the end of this last data entry. When it is desired to enter data, the magnetic tape is started forward from a point behind the location of the two marker pulses, identifying the location of the beginning of the last data item. Thus, the magnetic head over the marker track will read these pulses as the tape runs forward. When three of the pulses are read, the tape apparatus is instructed to commence the emptying of the contents of the register into the data track. Means are provided for writing two more pulses at the end of the data which has just been written. At that time, the tape is instructed to reverse its motion.

Upon reversing its motion, the magnetic head over the marker track will read the two new pulses which have just been written therein. Upon reading the first of these, the magnetic heads in the data track are enabled to read the data track information which has just been written. This occurs as the tape runs backwards. As this newly written information is read, it is checked for validity, parity, or any other property that it should possess. If this check is good, upon reading the first of the two pulses which previously indicated the end of the data item written previously, a signal is provided which calls for further data to be entered into the register, and the marker track head has applied thereto an erasing signal so that it will erase the two pulses which previously marked the beginning of the last item of data. The tape is then stopped and when the register is filled it is ordered to run forward again.

The cycle of operations just described is then repeated. The spacing with which the four pulses in the marker track are laid down to identify the beginning and the end of the last item of data which is written is timed very accurately. In reading these pulses, it is required that they occur with the same timing with which they were laid down, or else this invention provides an indication of faulty tape speed, dirt, or other probable troubles which must be cleared before further writing is permitted. Further, if the checking apparatus indicates that the data is incorrect, then further entry of data is prevented.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
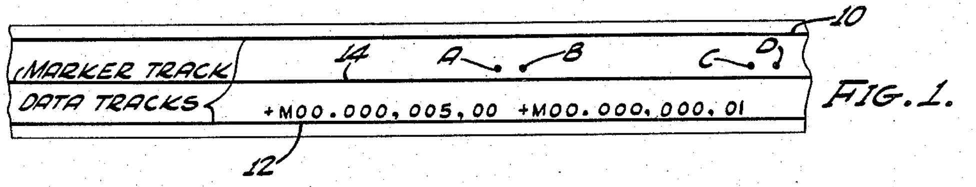
Figure 1 is a representation of the markings placed on tape in accordance with this invention.

Figure 1 is a representation of what is contained on the magnetic tape on which data has been written in accordance with this invention. The magnetic tape 10 will have a number of data tracks 12, in which items of data are written in one of the many binary codes. Adjacent to the data tracks is a marker track 14, the purpose for which will be described subsequently herein. It will be noted that four pulses, respectively designated as A, B, C, D are written in the marker track. Pulse A appears adjacent the last digit of the next-to-the-last item in the data track. Pulse B appears in the marker track and adjacent to the first digit of the last item, which, in this case, happens to be the sign. Pulse C is in the marker track adjacent the last digit of one of the last items in the data track, and pulse D follows pulse C and bears the same relationship time or space-wise to pulse C as pulse B bears to pulse A. Thus, the four pulses laid down in the marker track are laid down in pairs, the first two being at the beginning of the last item in the data track and the last two being at the end of the last item in the data track.

Figure 2:
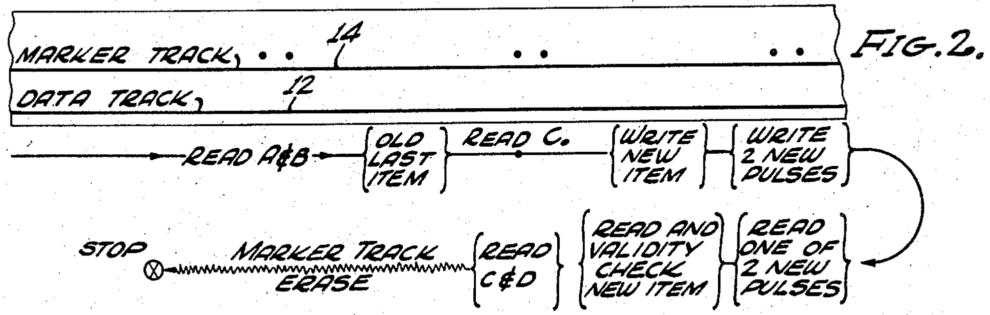
Figure 2 is a representation of tape markings in the marker track and a flow diagram illustrating the sequence of operations occurring in a cycle of operations in accordance with this invention.

Figure 2 may be termed a flow diagram of the sequence of events that occurs as the embodiment of the invention operates. When it is desired to write data into the data track on the tape, as shown by the flow diagram, the tape is started forward. A magnetic transducer head in the marker track will read the pulses which have been laid down therein. It first reads pulse A and then it reads pulse B. Thereafter, it will read pulse C. At the time of reading pulse C, if the time of the occurrences of pulses A, B, and C are correct, then writing circuitry for data is enabled. However, writing does not commence until pulse D is read. This pulse must occur at the proper time also, or writing of a new data item is aborted. Two new marker pulses are laid down at the end of the new data item in the marker track. The tape control apparatus is then instructed to reverse the motion of the tape.

In the process of writing data, the register which contained the item written was emptied. It is therefore necessary to fill this register with the next data item to be written. It is therefore necessary to stop the tape and reverse it and bring it forward again to write the contents of the register after it is filled anew. The time required for this tape operation is not wasted, but is made use of in the embodiment of the invention herein. When the tape is reversed, the marker track head will read the first of the two new pulses which were just written in the marker track. When this occurs, then the data heads over the data tracks are energized as the result, and they read the data items as the tape is traveling backwards. The data items being read may be checked for validity, for parity, or for any desired quality. Since the items is read a digit at a time and checked a digit at a time, the fact of the tape motion being in reverse when this reading goes on requires no unusual circuitry or operation. If during this interval it is indicated that the data which has just been written in the tape is in error, then the embodiment of the invention functions to prevent new data from being entered into the register until the reasons for the erroneous operation have been cleared. In continuing its reverse travel, the tape will bring the previous C and D pulses under the marker track head. These are read and if these occur with the proper spacing interval, then an erasing signal is applied to the marker track and the old A and B pulses are erased. The tape control apparatus will stop the tape and then reverse its motion to cause it to run forward again when the register is filled with new data.

From what has been described, it should be seen that not only does the embodiment of the invention permit efficient packing of items of data without any waste space between them, but also the time usually wasted when the tape is running in reverse is taken advantage of for the purpose of validity checking the items which have just been written on the tape. It should also be noted that in view of the fact that the pairs of marker pulses are required to occur within predetermined times, a check is made on the speed of the tape. If it is too fast or too slow, factors which can seriously adversely affect the intelligibility of the data being written, the embodiment of the invention detects this and provides warnings in accordance therewith. Because advantage is taken of the "coasting" time attendant stopping the tape when it is in motion, the necessity for having expensive tape transport mechanisms capable of stopping within extremely short intervals is also avoided.

Figure 3:
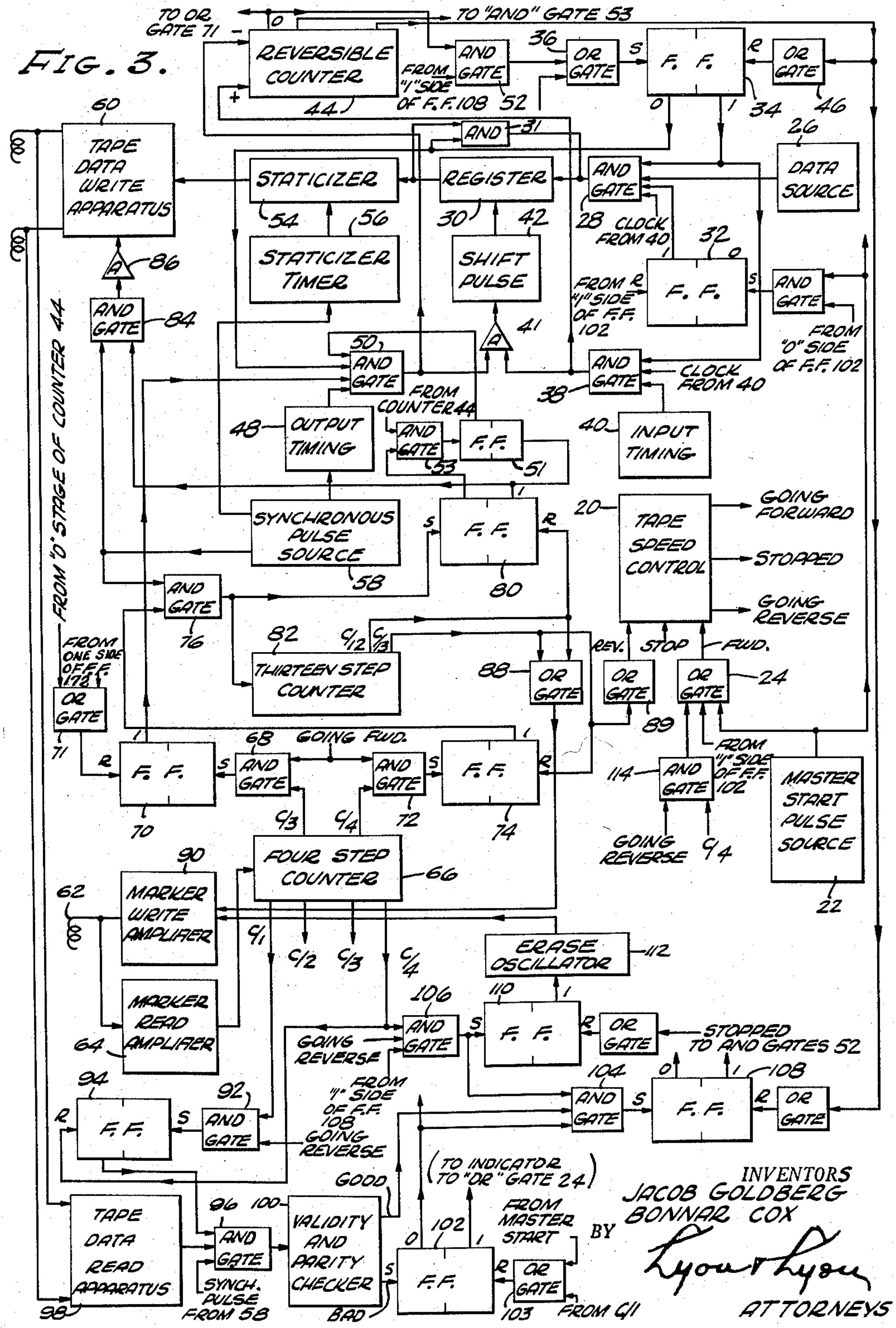
Figure 3 is a block diagram of an embodiment of the invention.

Reference is now made to Figure 3, which shows a block diagram of an embodiment of the invention. The usual and well-known tape transport apparatus which performs the function of running the tape forward, backward, or stopping it, in response to control signals, is represented by rectangle 20, designated as the tape speed control. This type of apparatus is well known in the information-handling field. Not only does this apparatus perform the function of controlling the direction of motion of tape in response to input electrical signals, but it also provides output signals indicative of the direction of motion which the tape is executing. Although any of the well-known arrangements may be employed, a preferred arrangment is described and shown in an application for Control Apparatus by Jacob Goldberg and Bonnar Cox, Serial No. 599,089, filed July 20, 1956, and assigned to a common assignee.

When it is desired to start the operation, a pulse from a source which here may be designated as the master start pulse source 22, is applied to an Or gate 24, which is connected to the "forward" control lead of the tape speed control apparatus 20. This starts the tape running forward.

Data from a data source 26, which may be punched paper tape or a magnetic drum or any other source of the data, is applied to an And gate 28, the output from which is applied to a shift register 30. The And gate 28 is enabled to pass the data pulses to the shift register 30 only in the presence of three other inputs. One of these, labeled "clock," consists of clock pulses from a source of synchronizing pulses which may be provided in well-known manner from the magnetic drum from which the data in the data source is derived. Other synchronizing pulse sources may be employed suitable to the transfer of the data into the register in accordance with the type of data source from which this data is being derived. In any event, the source of clock pulses is here represented by the rectangle 40 labeled "input" timing." Another of the required inputs to the And gate 28 is the output from a flip-flop 32 when it is set, and its "one" output side is high. The manner of controlling this flip-flop and the reason for its presence will be described subsequently herein.

The last required input to And gate 28 is provided by the output from the flip-flop 34 when it is set and its "one" output side is high. The reason for this flip-flop being present will be described in more detail subsequently herein. This flip-flop, however, is placed in its set condition, if not already there, by a master start pulse applied to an Or gate 36. This Or gate 36 output is connected to the input of the flip-flop 34 which is used to place it in its set condition. The output of flip-flop 34 when in its set condition is also applied to an And gate 38. A source of "input" timing pulses 40 provides a second required input to the And gate 38.

And gate 38 is enabled and input timing pulses may be applied through an amplifier 41 to the shift pulse source 42 for the circulating register 30. The shift pulse are applied from the source 42 to the register 30. These shift pulses thus have the timing required to properly enter the data from the data source 26 to the register.

A reversible counter 44 serves the function of determining when the register is filled and when it is empty. The counter adds counts, or pulses, which are applied to the shift pulse source from the input timing 40. When the reversible counter has a full count, it provides an output signal which serves to reset flip-flop 34 through an Or gate 46. When this occurs, the And gate 28 can no longer transmit data to the register 30. Also, the And gate 38 is no longer enabled, whereby the input timing pulses are no longer applied to the shift pulse generator 42.

The register 30 is of the well-known circulating type. That is, if desired, its output may be reinserted into the register again. This is accomplished by providing an And gate 31 having one input connected to the output of the register and its second enabling input connected to the reset, or zero, output of flip-flop 34. The output of And gate 31 is applied to the input of register 30. The result of the connections described is that the contents of register 30 do not circulate when new data is being entered into the register, since at that time flip-flop 34 is in its set condition. Otherwise, And gate 31 is enabled and the contents of the register will circulate.

For shifting out the data from the register, an output timing pulse generator 48 is employed. It applies its output to an And gate 50. As one of the enabling inputs of this And gate 50, the zero, or reset, output from flip-flop 34 is required. This occurs when reversible counter 44 is filled, resetting the flip-flop 34 through the And gate 46. A second enabling input is provided by the "one" output side of flip-flop 70 and a third enabling input is provided by the "zero" output side of flip-flop 51. The operation of these will be subsequently explained. The pulses which are applied by the output timing to pulse the shift pulse generator 42 are subtracted from the count in the reversible counter which was inserted as the result of the input timing pulses. Thus, when the reversible counter has reached its initial, or zero, count, an output is applied to an And gate 52, which through Or gate 36 is applied to set the flip-flops 34. As will be described later, And gate 52 will only be opened if the validity check of the previously written data is good. This is evidenced by the "one" output of flip-flop 108 being high. This output is the second required input for enabling And gate 52.

The contents of the register 30 are shifted out into the staticizer 54 and are also circulated. The staticizer is an array of gates and flip-flops which enable data which flows serially to be presented in parallel form. It is shown in detail in Figure 5. It is customary to write data on magnetic tape in several parallel data tracks. For example, if a seven-binary-digit code is employed, it is customary to use a magnetic tape having seven data tracks with seven magnetic transducer heads over those tracks. The seven binary digits are applied simultaneously to magnetic transducer heads to be written adjacent each other on the magnetic tape. If the seven binary digits are in serial form in the register, the staticizer receives the seven serial binary digits and applies them in parallel to the tape-data-read apparatus.

Staticizer timer 56, which is synchronized from the synchronization pulse source 58, serves the function of opening gates in the staticizer one at a time in sequence, so that the seven serial binary digits will be respectively entered into the seven flip-flop circuits in the staticizer. These are then transferred out and written onto the tape through the tape-data-write apparatus 60. For the purpose of using concrete numbers in describing the invention, but not to be construed as a limitation, let it be assumed that each data item contains twelve characters, each of which has six binary digits and one parity digit. Thus, the register 30 requires a capacity for holding 84 binary digits. The reversible counter could then be an 84-binary-digit reversible counter.

As the tape runs forward, a magnetic tape transducer head 62, which is positioned over the marker track, will read the pulses in the marker track. The magnetic head over the marker track will hereafter be designated as the marker track head. The marker track reading amplifier 64 applies the output pulses to a four-step counter 66. This counter will be shown in more detail subsequently herein. It is sufficient at this point to state that the counter has five counting stages, the first of which is a standby stage to which the counter always returns after completing a cycle of four counts. The counter is advanced in response to the pulses received from the tape marker head reading amplifier. As the counter advances, it times the intervals required for marker track pulses to occur. If these intervals are not correct and in accordance with the predetermined values, then, as will be described in more detail in Figure 4, further operation may be aborted.

When the counter has counted three of the four marker pulses, its output is applied on an And gate 68. This And gate, which also has applied thereto an output from the tape speed control, designated as the going-forward output indicative of the fact that the tape is then moving forward, is thus enabled to set a flip-flop circuit 70. The one output of this flip-flop circuit is applied to the And gate 50 for the purpose of enabling it so that the first character may be entered from the register into the staticizer after the occurrence of the third of the four marker pulses. When the reversible counter 44 has counted seven, indicative of the fact that the first character is in the staticizer, an And gate 53 is enabled, unless a flip-flop 80, the "zero" output side of which provides the enabling input thereto, has been driven to its set condition in the meanwhile. And gate 50 is thus blocked from passing any further output timing pulses and the data in the register and staticizer is held until flip-flop 80 is reset.

If the marker pulse timing is proper, flip-flop 70 remains set until such time as the reversible counter 44 has indicated that the register is empty, at which time flip-flop 70 is reset. When the fourth marker pulse is read, the counter 66 is transferred to its fourth count condition. Its output is applied to an And gate 72. This And gate also receives an input from the tape speed control, indicative of the fact that the tape is going forward. A flip-flop 74 is set from the output of And gate 72. Its output, when in the set condition, is applied to an And gate 76. The And gate 76 requires as its other enabling input an output from the synchronous pulse source 58. A flip-flop 80 is set by the leading edge of the first synchronous pulse which passes through the And gate 76. This flip-flop 80 is reset when a thirteen-step counter 82 reaches its next-to-the-last, or twelfth, count condition. The 13-step counter 82 employs "character" timing. It advances one count for every seven digit shift pulses applied to the shift pulse source 42 for the shift register 30. Thus, for every character consisting of seven digits shifted out of the register, the counter advances one count. Flip-flop 74 is reset when this counter 82 reaches its last count condition.

It should be noted that flip-flop 80 is set upon the first count being applied to the thirteen step counter and remains set until the twelfth count, when it is reset. Flip-flop 51 is reset when flip-flop 80 is set. Thus And gate 50 is enabled to continue the application of shift pulses to the shift pulse source for the duration of the writing interval. The "one" output of flip-flop 80 is also employed to enable an And gate 84 having the sync pulses being applied to the counter 82 as its other input. The output of And gate 84 is applied through an amplifier 86 to enable the writing of data synchronously by the tape-data-write apparatus 60. This is more clearly shown in Figure 5. The output of the counter 82 on the twelfth count resets flip-flop 80. Thus, writing of data is terminated. The output upon attaining the twelfth count is also applied to an Or gate 88, the output from which applies a pulse to a marker write amplifier 90. This causes the marker head 62 to write a pulse in the marker track adjacent the last character which was written in the data tracks. When the counter attains its thirteenth count state, it applies its output to the Or gate 88. The output of the Or gate is again applied to the marker write amplifier 90 to cause a second pulse to be written adjacent the data track at the location for the next character in the next item of data to be written.

The output from the 13-step counter 82 at its thirteenth count is also applied to the flip-flop 74 to reset it. Thereby, And gate 76 is no longer enabled. The output of the thirteenth counter stage is also applied to the tape speed control apparatus 20 through Or gate 89 to instruct it to begin the operation of reversing the motion of the tape.

As described thus far, the master start pulse instructs the tape to start running forward. Data from the data source is entered into the shift register until such time as the shift register is filled. At this time, by operation of an indicator for the contents of the register, the entry of further data is prevented. When three of the four marker pulses have been timed and counted, the shift register is instructed to circulate data and to begin the entry of data into a staticizer. When the fourth marker pulse is read, the tape-data-write apparatus is enabled to write the data appearing in the staticizer onto the magnetic tape. A 13-step counter counts the number of characters being written on the magnetic tape. When the last one of these is written, the counter instructs the marker pulse transducer head to write a new marker pulse adjacent to the location of the last character. When the counter advances to its thirteenth count, a second new marker pulse is written to indicate the next available character location. The tape is then instructed to begin to reverse its motion.

In the course of reversing, the tape will first be brought to a stop and then commences to run backwards. In running backwards, the marker track head will first read the second of the new pulses which were laid down in the marker track. As soon as this occurs, the output of the four-step counter 66 in its first count condition is applied to an And gate 92. As a second required input, the And gate has applied thereto the output of the tape-speed-control unit 20, indicative of the fact that the tape is going in reverse. This serves to set a flip-flop 94. The one output of flip-flop 94 is applied to an And gate 96. And gate 96 also has applied thereto sync pulses from the source 48. The tape-data-read apparatus 98 is thus enabled to read the data on the tape which has just been written.

The output of the tape-data-read apparatus is applied as the result of the enabling of gate 96 to a validity and parity checker 100. The fact that the data which was previously written is being read in reverse makes no difference here. Each character in an item of data consisting of seven binary digits is individually checked by the validity and parity checker and not the entire item in its entire sense. In other words, a number or a letter at a time is checked and not the spelling of a word or the total amount of a number. The validity and parity checker may consist of a flip-flop circuit, which if odd parity is employed, for example, must remain in its odd state after each seven bits are applied thereto. Alternatively, a check may be made to establish whether or not the seven-binary digits represent a meaningful arrangement of the code being employed. Still another check can be to retain the items of data which were written and successively apply them to a comparator in time coincidence with the readout from the tape apparatus. All of these expedients are well known in the art and will not be gone into here, in order to reduce the complexity of the explanation and avoid confusion.

Regardless of the type of check employed, at the end of such check either a "good lead" or a "bad lead" will be energized, indicative of whether or not the item of data which has been recorded is good or bad. If it is bad, then the bad lead will cause a flip-flop circuit 102 to be set. This energizes an indicator from the one side of the flip-flop circuit. Furthermore, flip-flop 32 is reset, thus preventing the entrance of further new data into the register. Flip-flop 102 can be reset by the application of a master start pulse to its reset lead. The output of flip-flop 102, when in its set condition, instead of merely passively stopping the apparatus and indicating a bad writing operation has occurred, may be employed to attempt another writing operation with the same data. By virtue of the register 30 being a circulating register and since And gate 31 was enabled, the data is still in the register in position to be transferred into the staticizer 54 again. Thus, since flip-flops 32 and 34 are still not set, applying the "one" output of flip-flop 102 to the Or gate 24 of the tape speed control 20 will cause the tape to come to a stop at some point behind the first two, or old, marker pulse pairs and then start running forward again. The system will operate in the same fashion as was previously described, except that this time the data and marker pulses are written over the ones written previously. The flip-flop 102 is reset when counter 66 counts the first marker pulse. This C/1 output is applied to Or gate 103. The reversible counter 44 remains at its "empty" or zero count condition, since the output timing pulses are applied to its subtract input and the counter is already as low as it can count. The described interlocking circuits connected to the validity-indicating flip-flop 108 prevent this from adversely affecting the operation of the system. If the validity check is good this time, then the apparatus operates as is described below. If not, it can recycle until it is stopped, either manually or automatically, by providing another counter which counts the recycles and then stops the apparatus after a predetermined number of them.

If the data which has just been checked is valid and good, then the signal indicative thereof is applied to an And gate 104. And gate 104 has a second required input consisting of the zero side output of flip-flop 102. This requires that none of the items which have been checked is bad. A third required input to the And gate 104 is the output of an And gate 106. This And gate is enabled when it receives an output from the marker pulse counter indicative of the fact that four pulses have been counted and also an output from the tape-speed control, indicative of the fact that the tape is still going in reverse. Thus, the output from And gate 104 will enable flip-flop 108 to be set. When this occurs, And gate 52 is enabled. As previously stated, the other required input to And gate 52 is that the reversible counter be in its zero state, which is indicative of the fact that the register 30 is empty. Thus, flip-flop 34 will be set and data from data source 26 can then be entered into the register.

Flip-flop 108 is reset when the reversible counter 44 indicates that the register is full.

It was pointed out previously that And gate 106 was enabled by the fourth count of the counter 66 and also a signal indicating that the tape was going in reverse. At this time, flip-flop 110 is driven to its set condition. Its output when in this condition will cause an erase oscillator 112 to be energized. The output of this erase oscillator 112 is applied to the marker write amplifier 90, whereby it will erase the marker track. Since the tape is still moving in reverse, the two pulses that it will erase are the two which are no longer required. These are the old A and B pulses.

The output of the four-step counter 66 when in its fourth state, or count condition, together with tape-speed-control output indicative of the fact that the tape is running in reverse, is applied to enable an And gate 114. The output of this And gate is applied to the Or gate 24, which then instructs the tape speed control to start the operation of going forward. In the process of going forward, the tape speed control first brings the tape transport apparatus to a stop. This will provide an output indicative of the fact that the tape is stopped, at which time the flip-flop 110 is reset. This, in turn, results in turning off the erase oscillator 112. When the tape speed control moves the tape forward again, the operations which have been described will reoccur. The new data which is entered into the register will be written into the data tracks on the magnetic tape, commencing with the position identified by the fourth of the marker pulses. Then two new marker pulses will be written identifying the end of this new item of data.

Figure 4:
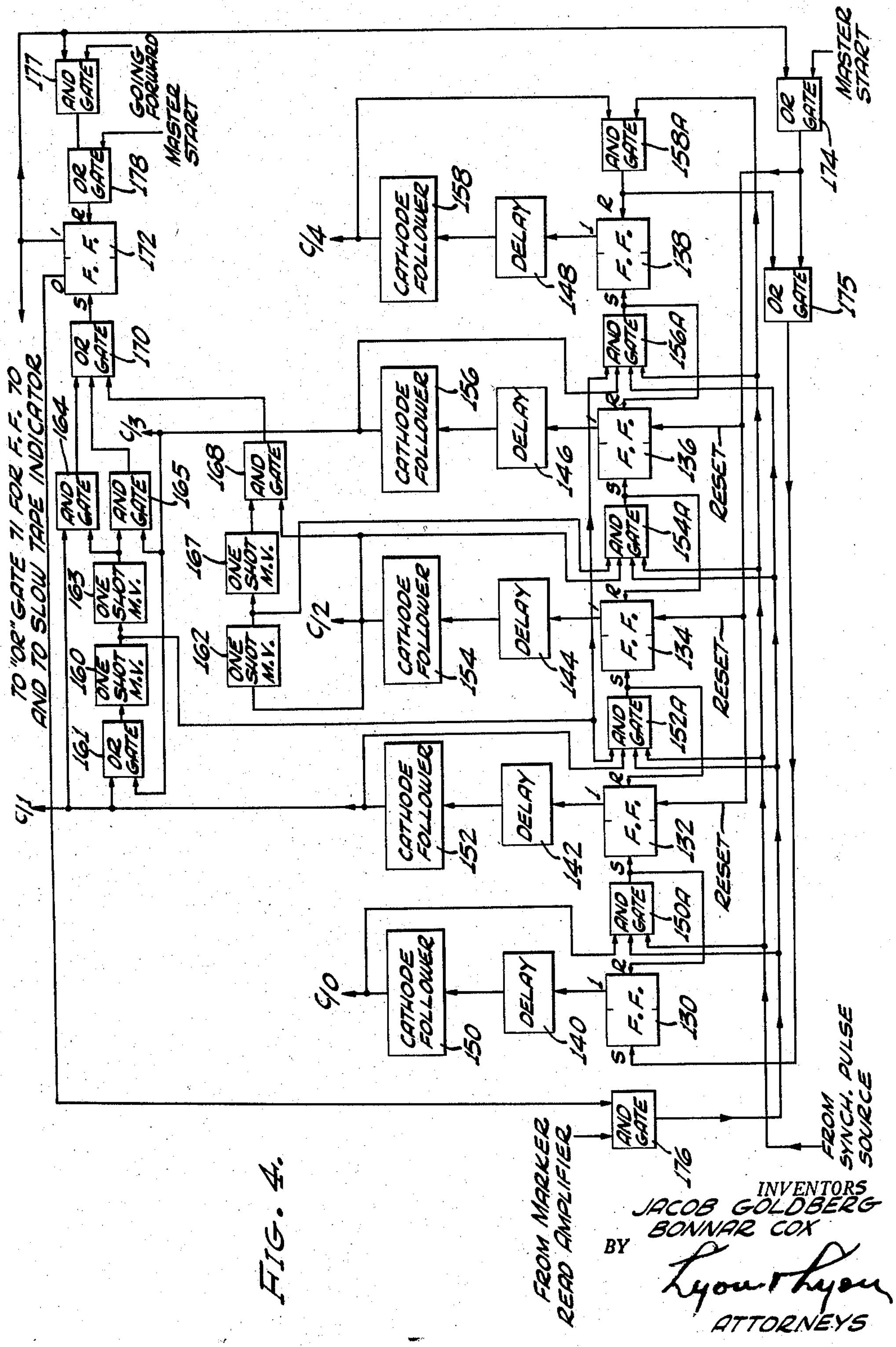
Figure 4 is a block diagram of a four-step counter and associated timing circuitry suitable for use in this invention.

Reference is now made to Figure 4, which shows a block diagram of the marker pulse counter, as well as the arrangement whereby no writing of data occurs unless the proper intervals occur between marker pulses. This counter is of a type which has been described and claimed in a patent application by James E. Heywood for a Gated-Delay Counter, filed December 28, 1953, Serial No. 400,645, and assigned to a common assignee. The basic gated-delay counter comprises as many flip-flop stages as are required. Five are needed here, 130, 132, 134, 136, and 138. Each flip-flop stage applies its "one" output to a delay circuit 140, 142, 144, 146, and 148. Each delay circuit applies its output to a cathode follower 150, 152, 154, 156, and 158. Between the respective flip-flop stages are And gates 150A, 152A, 154A, 156A, and 158A. When these And gates are enabled, they set the succeeding flip-flop stage and reset the preceding flip-flop stage. All of the And gates require as one of their enabling inputs a pulse from the synchronizing pulse source. And gates 150A through 156A require as a second enabling input a pulse from the marker read amplifier. All of the And gates require as their third input that the preceding flip-flop stage be in its set condition. And gates 152A and 156A receive a fourth required input from a one-shot multivibrator 160, which is driven through an Or gate 161 from the output of either the cathode follower 152 or the cathode follower 156. And gate 154A receives as a fourth required input the output from a one-shot multivibrator 162. This is driven from output received from cathode follower 154.

Thus, as marker and sync pulses are applied to the counter, the flip-flop stages successively are driven to their "one" state and the preceding flip-flops are reset. The respective states of the counter are designated as C/0 through C/4. The first stage of the counter, as previously pointed out, is the standby flip-flop stage. Upon receiving the first marker pulse designated as A, the flip-flop state 132 is driven to its one condition. Thereupon, one-shot multivibrator 160 is tripped. As is well known, a one-shot multivibrator has a stable and unstable state and is driven from its stable to its unstable state upon receiving an input pulse. It remains in its unstable state for a time determinable by the values of the components selected for it. It then returns to its stable state, at which time it provides an output pulse. For the present application, the interval of the unstable state of one-shot multivibrator 160 is made the interval between pulses A and B and the interval between pulses C and D in the marker track. The interval measured by one-shot multivibrator 162 is that required for pulses B and C to occur correctly. Suitable one-shot multivibrator circuits as well as flip-flop circuits are described and shown in the text Electronics, by Elmore and Sands, published in 1949 by the McGraw-Hill Book Company, on pages 78–92.

With the circuitry described, the first marker pulses will cause one-shot multivibrator 160 to be triggered. Its output to And gate 152A will occur at a time when the marker read head should be reading the second marker pulse if the tape speed is proper. If it is, then And gate 154A is enabled and sets flip-flop 134 and resets flip-flop 132. What happens if the second marker pulse is not received on time will be described subsequently. Output of cathode follower 154 is applied to And gates 154A, 168, and is also applied to drive one-shot 162. The output from cathode follower 154 is received by And gate 154A at a time when the third marker pulse, designated as the C marker pulse, should be read. At this time, flip-flop 136 is driven to its set condition and flip-flop 134 is reset. The output of flip-flop 136 is the C/3 pulse. It enables flip-flop 70 to be driven to its set condition and drives one-shot multivibrator 160 again through Or gate 161. The one-shot multivibrator will provide an output pulse after a delay interval which is determined as the interval required for the D pulse to be read. The output of one-shot 160 is applied to the And gate 156A, and if the magnetic tape is running at the proper speed for writing the D pulse will appear at the proper time, And gate 156A will be enabled, flip-flop 136 is reset, and flip-flop 138 is set, providing the required C/4 output therefrom. The system then proceeds to operate in the manner described previously. If any of the marker pulses do not appear at the proper time, the counter does not count further but is reset by apparatus to be described. Writing is prevented, since when the C/4 output of the counter is not provided, the writing apparatus is not enabled to write onto the magnetic tape. The apparatus may be recycled in another attempt to write, or the apparatus may be stopped and the difficulty investigated.

One-shot multivibrator 160 drives a second one-shot multivibrator 163 with its output. This second one-shot multivibrator provides a delay interval required for either flip-flop 132 or flip-flop 136 to be reset if the tape was up to speed and either And gate 152A or And gate 156A was enabled to provide the resetting signal. If, however, the flip-flop 132 was not reset, then an And gate 164 is enabled by the output of the one-shot multivibrator 163 and the output of the cathode follower 152. If flip-flop 136 is not reset in time, then an And gate 165 is enabled by the output of one shot 163 and cathode follower 156. A one-shot multivibrator 167 serves a similar function as one-shot 163. It is driven by an output from one-shot 162. If flip-flop 134 is not reset within a suitable time after the third marker pulse is received, an And gate 168 is enabled. And gates 164, 165, and 168 all apply their outputs to an Or gate 170. The output of this Or gate 170 is applied to set a flip-flop 172.

The outputs of this flip-flop 172, when set or reset, are used for a number of operations. First, the one output is applied to the Or gate 71 in Figure 3, which is coupled to the reset lead of flip-flop 70. Flip-flop 70, on being reset, prevents further shift pulses from being applied to the shift register, whereby the data is kept therein. The "one" output of the flip-flop 172 is also applied to an Or gate 174, which serves the function of setting flip-flop 130 through an Or gate 175 and resetting the remaining counter stages. The "one" output of flip-flop 172 is also applied to an indicator for the system which indicates that the tape is slow. The "one" output of flip-flop 70 may be used to recycle the tape speed control apparatus whereby the tape direction is reversed and then started forward again or to stop the tape motion, if desired. The output of the flip-flop 172 when in its reset condition is used to enable an And gate 176. This And gate is enabled to pass marker pulses from the marker read amplifier to the counter. This enabling output is removed, and therefore no marker pulses are able to be read until flip-flop 172 is reset. This reset is accomplished by a "going forward" signal from the tape speed control 20 and the "one" output of flip-flop 172 being applied to an And gate 177. Either the output of And gate 177 or a master start pulse is applied to an Or gate 178, the output of which resets flip-flop 172. If the tape attains its required forward speed, as indicated by the counter 66 successfully completing its count, then the system will proceed to write as previously described. The number of times repeated passes are made is left to the wishes of the user of the apparatus. A counter may be provided, if desired, which is actuated from the output of flip-flop 172, and if the system does not operate properly after it has been cycled the number of times indicated by the counter, the entire system may be brought to a halt. Otherwise, the output of flip-flop 172 may itself be employed to prevent further operation of the system. The timing operation of the counter 66 occurs not only for writing but also in the reading for validity checking. Not only is proper tape speed assured by this system, but also stray pulses or noise pulses which can cause faulty writing and reading are detected, since these will cause an operation of the counter 66 similar to faulty tape speed.

Figure 5:
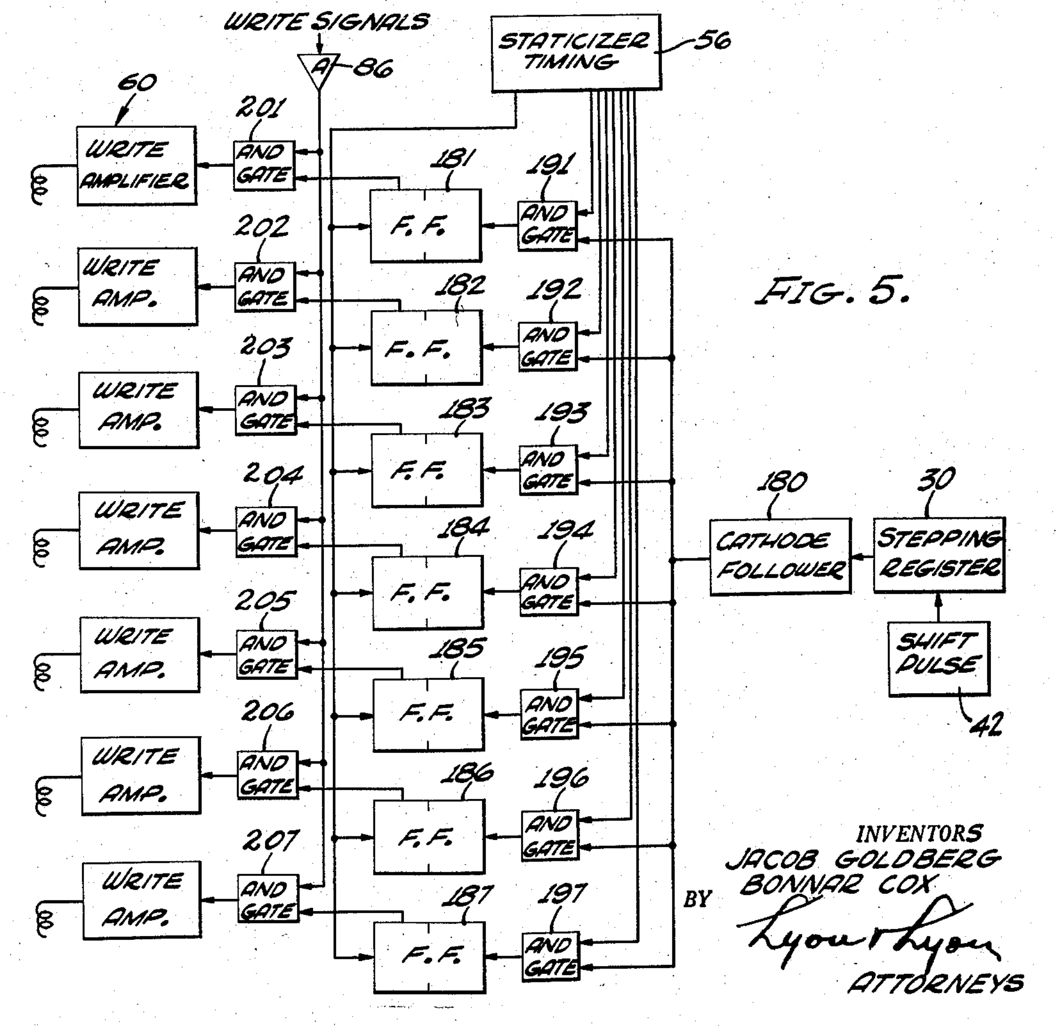
Figure 5 is a block diagram of a serial to parallel staticizer in accordance with this invention.

Figure 5 is a block diagram of a suitable staticizing and writing system. The output of the stepping register is applied to a cathode follower 180. The output of this cathode follower is applied to the set lead of seven flip-flops 181 through 187, through seven And gates 191 through 197. These And gates are successively enabled by the output of the staticizer timing control. Thus, as the stepping register steps out one binary digit at a time, the correspondingly positioned And gate in the time sequence will be enabled, whereby the flip-flop coupled to the And gate is driven or not, depending upon whether the binary digit at that time is a one or a zero. The one outputs of the flip-flops 181 through 187 are coupled to And gates 201 through 207, respectively. The cathode follower will simultaneously enable all these And gates in response to pulses from the synchronizing pulse source. Thereby, the writing amplifiers can drive the respective transducer heads and apply the data to the magnetic tape. The staticizer timing source resets the flip-flops 181 through 187 just before it commences to successively enable the And gates 191 through 197.

And gates, Or gates, flip-flops, registers, and counters are circuits which are well known in the information-handling field and accordingly will not be described in detail at this time. Suitable And gates and Or gates are described, for example, in an article by Tung Chan Chen in the Proceedings of the Institute of Radio Engineers, vol. 38, pp. 511–514, published May 1950, and entitled Diode Coincidence and Mixing Circuits in Digital Computers. They are also described in the above-noted book Electronics. A suitable register is found described in an article in Electronics Magazine, pp. 181–184, November 1949, by Stevens and Knapton, entitled Gate Type Shifting Register. It may be noted that a suitable type of validity and parity checker for a five-binary digit system is shown and described in an application by William H. Kautz for a Code Converter, Serial No. 533,681, filed September 12, 1955, and assigned to a common assignee.

There has accordingly been shown and described herein a novel and useful system for writing on tape, which enables the desired amount of packing of data to be achieved on such tape by the spacing between the two marker pulses which are laid down at the end of data which has been written. It should be pointed out here that these two pulses need not necessarily be written at the end of an item of data which has just been written onto the tape, but may be written at some distance further along on the tape for the purpose of permitting space after the item just written for the insertion of future items. Thus, the system just described may so be modified by providing desired time delays in the leads from the twelfth to thirteenth stages of the counter which energize the marker head. The use of the marker pulses enables not only the packing of items which are written successively but also the most effective utilization of space on magnetic tape when it is desired to reserve for future storage space on the magnetic tape. Proper writing speed is assured and noise is detected. The system described makes a maximum utilization of the time required for the entry of data onto tape in successive amounts. Simultaneously, the tape speed is checked to assure the fact that not only will the new items of information to be written be written properly, but also thereby overlap of new items over items previously written is prevented, as well as the too-great spacing of items. Fewer than four pulses may be employed in the marker track—for example, only the last two pulses may be employed. However, this lessens the protection afforded. More than four pulses may be employed in the marker track if desired, also. However, the number selected here permits a maximum of protection with the most economy in the amount of apparatus required.

We claim:

1. A system for writing successively items of data on magnetic tape comprising means for marking on said tape the location of an item of data to be written, means for writing an item at the location established by said means for marking, means operative at the end of writing said item for energizing said means for marking, means for reversing the motion of said tape, means for reading the item which was just written as said tape moves in reverse, and means for determining whether the output of said means for reading the item is correct.

2. A system for writing successively items of data on magnetic tape comprising means for marking on said tape the location of an item of data to be written, means for writing an item on said tape at the location established by said marking, means operative at the end of writing said item for energizing said marking means to mark the location for the next item of data to be written, means responsive to said marking means being energized to order said tape motion reversed, means for reading the item of data which was just written as said tape moves in reverse, means for determining whether the output of said means for reading the item is correct, and means for erasing item location marks prior to the ones at the beginning and ending of the item which was just written.

3. A system as recited in claim 2 wherein said means for determining provides a first output responsive to said item which was just written being correct and a second output responsive to said item being incorrect, and there are means responsive to said first output to order the next data item for writing, and means responsive to said second output to recycle said system to rewrite said item.

4. A system for writing successively items of data on magnetic tape comprising means including transducer means for placing a pair of spaced magnetic markings on said tape to establish the location of an item of data to be written, means for measuring the interval required for said spaced magnetic markings to be read by said transducer means, means responsive to the reading of said spaced magnetic markings to write an item of data at the location established on said tape, and means to prevent said item being written by said means responsive to the interval measured differing from a predetermined value.

5. A system for writing successively items of data on magnetic tape comprising means including transducer means for placing a pair of spaced magnetic markings on said tape to establish the location of an item of data to be written, means for measuring the interval required for said transducer means to read said spaced magnetic markings, means responsive to said spaced magnetic markings being read to write an item of data at the location established on said tape, means to prevent said item being written by said means responsive to the interval measured differing from a predetermined value, and means operative at the end of writing said item for energizing said means for placing a pair of spaced magnetic markings to establish the location for the next item of data.

6. A system for writing successively items of data on magnetic tape comprising means including transducer means for placing a pair of spaced magnetic markings on said tape to establish the location of an item of data to be written, means for measuring the interval required for said spaced magnetic markings to be read by said transducer means, means responsive to said spaced magnetic markings being read by said transducer means to write an item of data at the location established on said tape, means to prevent said item being written by said means responsive to the interval measured differing from a predetermined value, means operative at the end of writing said item for energizing said means for placing to place another pair of spaced magnetic markings to establish the location for the next item of data, means responsive to said means for placing having been operated to order said tape motion reversed, means for reading said item which was just written, means for determining the correctness of the output of said means for reading, and means responsive to said determining means indicating said data item being correct to order the next data item to be written.

7. A system as recited in claim 6 wherein each item of data comprises a plurality of characters, one marking of said pair of spaced magnetic markings is placed adjacent the location of last character of an item which has been written, and the other marking of said pair of spaced magnetic markings is placed adjacent the location for the first character of an item which is to be written.

8. A system for writing successively items of data each including a plurality of data characters on magnetic tape comprising means including a magnetic transducer for magnetically marking said tape with a first mark adjacent the location of a last data character which is being written and with a second mark adjacent the location of the next data character to be written, means to write the next data item with its first data character at the location adjacent said second mark responsive to said first and second marks being read by said magnetic transducer while said magnetic tape is moving forward, means for energizing said means for magnetically marking said tape to write a new first and second mark as the last data character is written, means for reversing said tape motion, means for reading the data which was just written responsive to said magnetic transducer reading the new first and second magnetic marks, means for checking the output of said means for reading data, means responsive to said magnetic transducer reading said first magnetic mark to provide an erasing signal for erasing any previous magnetic marks.

9. A system for writing as recited in claim 8 wherein there is included means for measuring the interval elapsing between said transducer reading a first and a second mark, and means responsive to said interval differing from a predetermined value to prevent the writing by said means to write the next data item.

References Cited in the file of this patent

UNITED STATES PATENTS

| | | |
|---|---|---|
| 2,614,169 | Cohen | Oct. 14, 1952 |
| 2,782,398 | West et al. | Feb. 19, 1957 |
| 2,797,378 | Johnson | June 25, 1957 |
| 2,813,259 | Burkhart | Nov. 12, 1957 |
| 2,817,072 | Chien et al. | Dec. 17, 1957 |